US012594525B2

(12) United States Patent
Oishi et al.

(10) Patent No.: US 12,594,525 B2
(45) Date of Patent: Apr. 7, 2026

(54) EXHAUST GAS PURIFICATION CATALYST DEVICE

(71) Applicant: CATALER CORPORATION, Kakegawa (JP)

(72) Inventors: Shunsuke Oishi, Kakegawa (JP); Naruya Inada, Kakegawa (JP); Ryoichi Ogawa, Kakegawa (JP)

(73) Assignee: CATALER CORPORATION, Kakegawa (JP)

(*) Notice: Subject to any disclaimer, the term of this patent is extended or adjusted under 35 U.S.C. 154(b) by 387 days.

(21) Appl. No.: 18/023,542

(22) PCT Filed: Aug. 23, 2021

(86) PCT No.: PCT/JP2021/030843
§ 371 (c)(1),
(2) Date: Feb. 27, 2023

(87) PCT Pub. No.: WO2022/050115
PCT Pub. Date: Mar. 10, 2022

(65) Prior Publication Data
US 2023/0302406 A1 Sep. 28, 2023

(30) Foreign Application Priority Data
Sep. 2, 2020 (JP) ................................. 2020-147396

(51) Int. Cl.
*B01J 23/42* (2006.01)
*B01D 53/94* (2006.01)
(Continued)

(52) U.S. Cl.
CPC ..... *B01D 53/9454* (2013.01); *B01D 53/9468* (2013.01); *B01D 53/9486* (2013.01);
(Continued)

(58) Field of Classification Search
CPC ........ B01J 20/165; B01J 23/005; B01J 23/42; B01J 23/44; B01J 23/464; B01J 35/56;
(Continued)

(56) References Cited

U.S. PATENT DOCUMENTS 5,102,639 A * 4/1992 Chou ....................... B01J 23/63
502/302
6,514,905 B1 2/2003 Hanaki et al.
(Continued)

FOREIGN PATENT DOCUMENTS

DE 10 2009 022 914 A1 1/2010
EP 0 935 055 A2 8/1999
(Continued)

OTHER PUBLICATIONS

Nov. 2, 2021 International Search Report issued in International Patent Application No. PCT/JP2021/030843.
(Continued)

*Primary Examiner* — Cam N. Nguyen
(74) *Attorney, Agent, or Firm* — Oliff PLC

(57) ABSTRACT

An gas purification catalyst device having a catalyst coated layer formed on at least one base material, wherein: the catalyst coated layer includes a first catalyst coated layer on the upstream side of an exhaust gas flow, and a second catalyst coated layer on the downstream side of the exhaust gas flow; the first catalyst coated layer includes a hydrocarbon adsorbent and a catalytic precious metal; and the second catalyst coated layer includes a nitrogen oxide adsorbent and a catalytic precious metal.

20 Claims, 2 Drawing Sheets

(51) Int. Cl.

| | | |
|---|---|---|
| *B01J 20/16* | (2006.01) | |
| *B01J 23/00* | (2006.01) | |
| *B01J 23/44* | (2006.01) | |
| *B01J 23/46* | (2006.01) | |
| *B01J 23/63* | (2006.01) | |
| *B01J 29/40* | (2006.01) | |
| *B01J 29/70* | (2006.01) | |

(52) U.S. Cl.

CPC .......... *B01J 20/165* (2013.01); *B01J 23/005* (2013.01); *B01J 23/42* (2013.01); *B01J 23/44* (2013.01); *B01J 23/464* (2013.01); *B01J 29/70* (2013.01); *B01D 2255/1021* (2013.01); *B01D 2255/1023* (2013.01); *B01D 2255/1025* (2013.01); *B01D 2255/50* (2013.01); *B01D 2255/908* (2013.01); *B01D 2257/40* (2013.01); *B01D 2257/502* (2013.01); *B01D 2257/702* (2013.01); *B01D 2258/01* (2013.01)

(58) Field of Classification Search

CPC ....... B01J 35/57; B01J 29/70; B01D 53/9454; B01D 53/9468; F01N 3/101; F01N 3/2828

USPC ........ 502/302–304, 332–334, 339, 349–351, 502/355, 415, 439

See application file for complete search history.

(56) References Cited

U.S. PATENT DOCUMENTS

| | | | | |
|---|---|---|---|---|
| 8,637,426 | B2 * | 1/2014 | Hoke ...................... | F01N 3/103 502/333 |
| 8,734,743 | B2 * | 5/2014 | Muller-Stach ....... | B01J 37/0244 502/352 |
| 9,327,239 | B2 * | 5/2016 | Morgan ............. | B01D 53/9454 |
| 9,611,773 | B2 * | 4/2017 | Brown ................. | B01J 37/0221 |
| 9,636,634 | B2 * | 5/2017 | Chiffey ................ | B01J 37/0244 |
| 9,937,489 | B2 * | 4/2018 | Larsson ................... | B01J 21/04 |
| 9,993,772 | B2 * | 6/2018 | Gilbert .............. | B01D 53/9418 |
| 10,201,807 | B2 * | 2/2019 | Larsson ................... | B01J 23/44 |
| 10,286,359 | B2 * | 5/2019 | Chiffey ................... | B01J 23/58 |
| 10,369,555 | B2 * | 8/2019 | Burgess ................. | F01N 3/035 |
| 10,376,838 | B2 * | 8/2019 | Andersen ................. | B01J 23/52 |
| 10,399,037 | B1 * | 9/2019 | Wang ...................... | B01J 23/66 |
| 10,539,056 | B2 * | 1/2020 | Suzuki ................. | B01J 37/0219 |
| 10,821,401 | B2 * | 11/2020 | Chiffey ................... | B01J 23/38 |
| 10,850,264 | B2 * | 12/2020 | Nunan ................. | B01D 53/945 |
| 10,906,032 | B2 * | 2/2021 | Zheng .................... | B01J 23/002 |
| 11,110,435 | B2 * | 9/2021 | Onoe ...................... | B01J 23/42 |
| 11,207,642 | B2 * | 12/2021 | Goodwin .............. | B01J 23/63 |
| 11,224,840 | B2 * | 1/2022 | Suzuki .................... | B01J 35/40 |
| 12,025,041 | B2 * | 7/2024 | Chen .................... | F01N 13/008 |
| 2009/0191108 | A1 | 7/2009 | Blanchard et al. | |
| 2018/0353902 | A1 * | 12/2018 | Chiffey ............... | B01J 37/0036 |
| 2019/0353068 | A1 * | 11/2019 | Moser .................. | F01N 3/0842 |
| 2020/0230583 | A1 | 7/2020 | Banno | |

FOREIGN PATENT DOCUMENTS

| | | |
|---|---|---|
| JP | 2000-135419 A | 5/2000 |
| JP | 2003-205245 A | 7/2003 |
| JP | 2006-187772 A | 7/2006 |
| JP | 2009-507634 A | 2/2009 |
| JP | 2010-112292 A | 5/2010 |
| JP | 2012-055842 A | 3/2012 |
| JP | 2017-532188 A | 11/2017 |
| JP | 2019-064879 A | 4/2019 |
| WO | 2016/024193 A1 | 2/2016 |
| WO | 2019/219817 A1 | 11/2019 |

OTHER PUBLICATIONS

Nov. 2, 2021 Written Opinion of the International Searching Authority issued in International Patent Application No. PCT/JP2021/030843.

* cited by examiner

EXHAUST GAS PURIFICATION CATALYST DEVICE

FIELD

The present invention relates to an exhaust gas purification catalyst device.

BACKGROUND

Exhaust gas purification catalyst devices are used so that nitrogen oxides (NOx), hydrocarbons (HC), and carbon monoxide (CO) contained in exhaust gas emitted from automobile engines are purified and thereafter released into the atmosphere. In exhaust gas purification catalyst devices, for example, a catalyst coating layer is formed on a cordierite honeycomb substrate. Such a catalyst coating layer of the exhaust gas purification catalyst device contains a catalyst noble metal which catalytically purifies NOx, HC, and CO.

In an exhaust gas purification catalyst device of the prior art, NOx emissions are high before the catalyst coating layer is sufficiently warmed up, such as at the time of engine start.

In connection thereto, catalyst purification by arranging a NOx adsorbent in an exhaust gas purification catalyst device, so that NOx is adsorbed prior to warm-up by the NOx adsorbent to reduce NOx emissions, and after warm-up, gradually releasing the NOx adsorbed prior to warm-up has been attempted.

For example, Patent Literature 1 describes an exhaust gas catalyst having a catalyst layer containing a zeolite having a skeleton substituted with a rare earth element on a support, and states that the performance of the NOx purification system is improved thereby.

Patent Literature 2 describes an exhaust gas purification catalyst device having a lower layer in which an HC trap containing a basic compound and a NOx trap containing a zeolite are arranged in this order from the exhaust gas flow upstream side and an upper layer which is a three-way catalyst layer.

CITATION LIST

PATENT LITERATURE

[PTL 1] Japanese Unexamined Patent Publication (Kokai) No. 2019-064879
[PTL 2] WO 2019/219817

SUMMARY

Technical Problem

However, conventionally known NOx adsorbents, such as zeolite, competitively adsorb NOx and HC and thus cannot adsorb NOx efficiently prior to warm-up and it has been difficult to sufficiently reduce the amount of NOx emissions prior to warm-up.

Thus, an object of the present invention is to provide an exhaust gas purification catalyst device by which the amount of NOx emissions prior to warm-up is sufficiently reduced.

Solution to Problem

The present invention is as described below.
<<Aspect 1>> An exhaust gas purification catalyst device having a catalyst coating layer formed on at least one substrate, wherein:

the catalyst coating layer contains a first catalyst coating layer on an exhaust gas flow upstream side and a second catalyst coating layer on an exhaust gas flow downstream side,
the first catalyst coating layer contains a hydrocarbon adsorbent and a catalyst noble metal, and
the second catalyst coating layer contains a nitrogen oxide adsorbent and a catalyst noble metal.
<<Aspect 2>> The exhaust gas purification catalyst device according to Aspect 1, wherein the first catalyst coating layer has:
a hydrocarbon adsorption layer which is formed on the substrate and which contains the hydrocarbon adsorbent, and
a first catalyst noble metal layer which is formed on the hydrocarbon adsorption layer and which contains the catalyst noble metal.
<<Aspect 3>> The exhaust gas purification catalyst device according to Aspect 1 or 2, wherein the second catalyst coating layer has:
a second catalyst noble metal layer which is formed on the substrate and which contains the catalyst noble metal, and
a nitrogen oxide adsorption layer which is formed on the second catalyst noble metal layer or as a portion of a surface layer of the second catalyst noble metal layer, and which contains the nitrogen oxide adsorbent.
<<Aspect 4>> The exhaust gas purification catalyst device according to Aspect 3, wherein the second catalyst noble metal layer contains one or two selected from a spinel and praseodymium oxide as the nitrogen oxide adsorbent, and
the nitrogen oxide adsorption layer:
is formed as a portion of a surface layer of the second catalyst noble metal oxide layer, and
is a layer enriched in palladium (Pd) as the nitrogen oxide adsorbent.
<<Aspect 5>> The exhaust gas purification catalyst device according to any one of Aspects 1 to 4, wherein the hydrocarbon adsorbent of the first catalyst coating layer contains a zeolite.
<<Aspect 6>> The exhaust gas purification catalyst device according to any one of Aspects 1 to 5, wherein the content of the hydrocarbon adsorbent in the first catalyst coating layer is 60 mass % or less relative to the total mass of the first catalyst coating layer.
<<Aspect 7>> The exhaust gas purification catalyst device according to any one of Aspects 1 to 6, wherein the first catalyst coating layer contains an OSC material.
<<Aspect 8>> The exhaust gas purification catalyst device according to any one of Aspects 1 to 7, wherein the first catalyst coating layer contains rhodium (Rh).
<<Aspect 9>> The exhaust gas purification catalyst device according to any one of Aspects 1 to 8, wherein the second catalyst coating layer contains an OSC material.
<<Aspect 10>> The exhaust gas purification catalyst device according to any one of Aspects 1 to 9, wherein the second catalyst coating layer contains one or two catalyst noble metals selected from palladium (Pd), platinum (Pt), and rhodium (Rh).
<<Aspect 11>> The exhaust gas purification catalyst device according to any one of Aspects 1 to 10, wherein the first catalyst coating layer is formed on a first substrate,
the second catalyst coating layer is formed on a second substrate, and
the first substrate having the first catalyst coating layer and the second substrate having the second catalyst coating layer are arranged in series in this order from an exhaust gas flow upstream side.

<<Aspect 12>> The exhaust gas purification catalyst device according to any one of Aspects 1 to 10, wherein the first catalyst coating layer and the second catalyst coating layer are formed on a single substrate in this order from an exhaust gas flow upstream side.

Advantageous Effects of Invention

According to the present invention, there is provided an exhaust gas purification catalyst device by which NOx emissions are sufficiently reduced prior to warm-up.

DESCRIPTION OF EMBODIMENTS

<<Exhaust Gas Purification Catalyst Device>>

The exhaust gas purification device of the present invention is an exhaust gas purification catalyst device having a catalyst coating layer formed on at least one substrate, wherein:

the catalyst coating layer contains a first catalyst coating layer on an exhaust gas flow upstream side and a second catalyst coating layer on an exhaust gas flow downstream side, the first catalyst coating layer contains a hydrocarbon adsorbent and a catalyst noble metal, and the second catalyst coating layer contains a nitrogen oxide adsorbent and a catalyst noble metal.

In the exhaust gas purification catalyst device of the present invention, a first coating layer containing a hydrocarbon adsorbent is arranged on an exhaust gas flow upstream side and a second catalyst coating layer containing a nitrogen oxide adsorbent is arranged on an exhaust gas flow downstream side. According to this structure, HC is adsorbed by the first catalyst coating layer on the upstream side prior to warm-up, and the concentration of HC in the exhaust gas flowing to the second catalyst coating layer on the downstream side is reduced. Thus, the degree of competition of NOx adsorption against HC adsorption in the second catalyst coating layer is reduced, and accordingly, the second catalyst coating layer can efficiently adsorb NOx, and NOx emissions prior to warm-up are reduced.

The HC adsorbed by the first catalyst coating layer and the NOx adsorbed by the second catalyst coating layer prior to warm-up are gradually released after warm-up and purified by the catalyst noble metal.

The exhaust gas purification catalyst device of the present invention is excellent in reducing NOx emissions, particularly prior to warm-up, due to the mode of operation described above.

4

Figure 1:
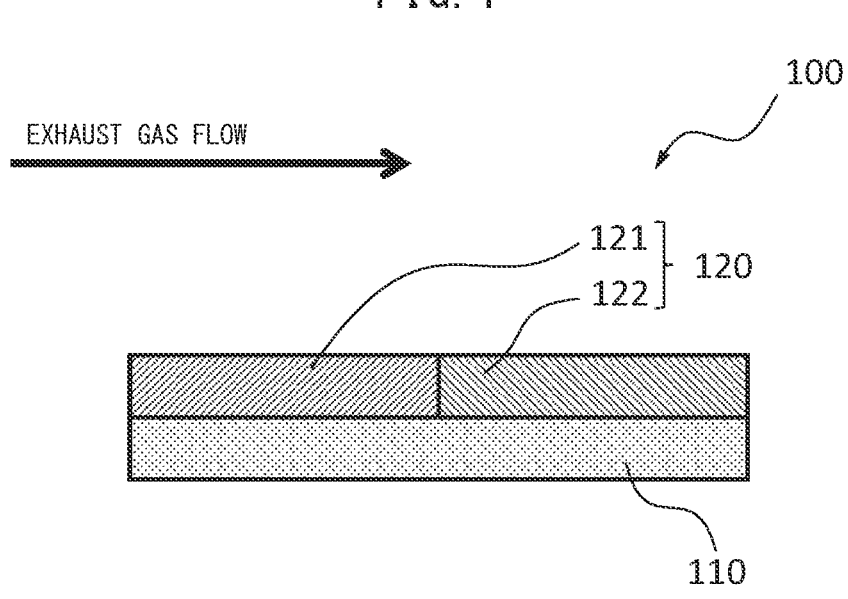
FIG. 1 is a schematic view showing an example of the structure of the exhaust gas purification catalyst device of the present invention.
Figure 2:
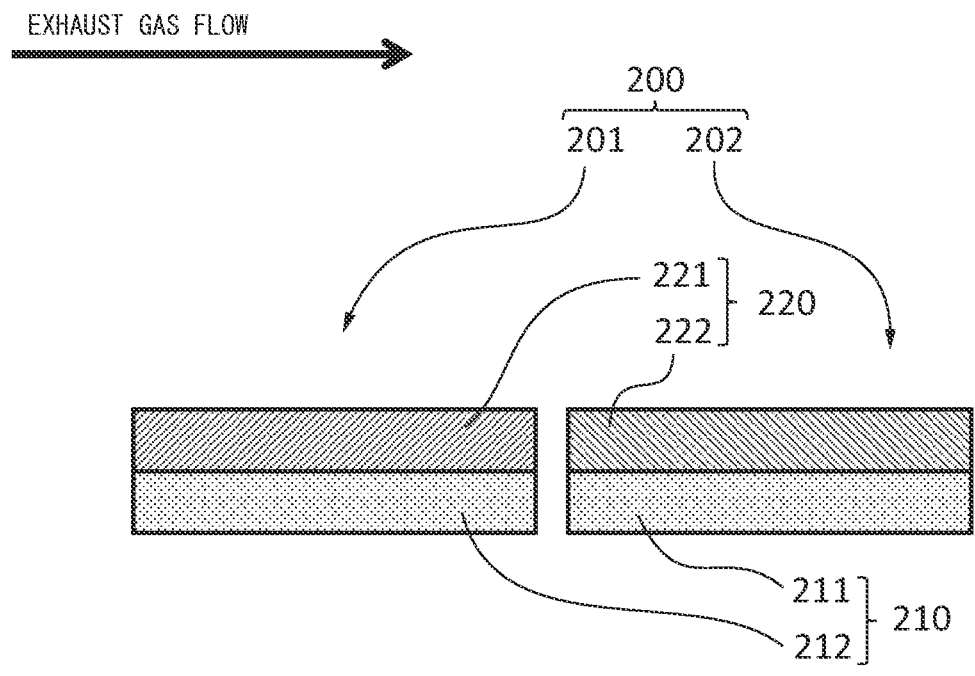
FIG. 2 is a schematic view showing another example of the structure of the exhaust gas purification catalyst device of the present invention.

The exhaust gas purification catalyst device of the present invention will be described with reference to the drawings. FIGS. 1 and 2 show respective examples of structures of the exhaust gas purification catalyst device of the present invention.

The exhaust gas purification catalyst device (100) of FIG. 1 has one substrate (110) and a catalyst coating layer (120) formed on the substrate (110). The catalyst coating layer (120) contains a first catalyst coating layer (121) on the exhaust gas flow upstream side and a second catalyst coating layer (122) on the exhaust gas flow downstream side. The first catalyst coating layer (121) contains a hydrocarbon adsorbent and a catalyst noble metal. The second catalyst coating layer (122) contains a nitrogen oxide adsorbent and a catalyst noble metal.

Similar to the exhaust gas purification catalyst device (100) of FIG. 1, the exhaust gas purification catalyst device (200) of FIG. 2 has a substrate (210) and a catalyst coating layer (220) formed on the substrate (210), and the catalyst coating layer (220) contains a first catalyst coating layer (221) on the exhaust gas flow upstream side and a second catalyst coating layer (222) on the exhaust gas flow downstream side. However, the exhaust gas purification catalyst device (200) of FIG. 2 has, as the substrate (210), two substrates—a first substrate (211) on the exhaust gas flow upstream side and a second substrate (212) on the exhaust gas flow downstream side. The exhaust gas purification catalyst device (200) of FIG. 2 has a first catalyst coating layer (221) on the first substrate (211), and a second catalyst coating layer (222) on the second substrate (212), each of which constitutes a sub-device.

In other words, the exhaust gas purification catalyst device (200) of FIG. 2 has:

a first sub-device (201) composed of a first substrate (211) and a first catalyst coating layer (221) formed on the first substrate (211), and a second sub-device (202) composed of a second substrate (212) and a second catalyst coating layer (222) formed on this second substrate (212), wherein the first sub-device (201) and the second sub-device (202) are arranged in series in this order from the exhaust gas flow upstream side.

In the exhaust gas purification catalyst device (200) of FIG. 2, the first catalyst coating layer (221) contains a hydrocarbon adsorbent and a catalyst noble metal, and the second catalyst coating layer (222) contains a nitrogen oxide adsorbent and a catalyst noble metal.

The constituents of the exhaust gas purification catalyst device of the present invention will be described below in order.

<Substrate>

The exhaust gas purification catalyst device of the present invention has at least one substrate. The number of substrates is typically one or two.

In an exhaust gas purification catalyst device having one substrate, the first catalyst coating layer and the second catalyst coating layer are formed on this one substrate in this order from the exhaust gas flow upstream side.

In an exhaust gas purification device having two substrates:

the first catalyst coating layer is formed on the first substrate, the second catalyst coating layer is formed on the second substrate, and the first substrate having the first catalyst coating layer and the second substrate having the second catalyst coating layer are arranged in series in this order from the exhaust gas flow upstream side.

As the substrate in the exhaust gas purification catalyst device of the present invention, any substrate which is commonly used for exhaust gas purification catalyst devices can be used. The substrate may be, for example, a straight-flow monolithic honeycomb substrate composed of a material such as cordierite, SiC, stainless steel, or inorganic oxide particles.

<Catalyst Coating Layer>

The exhaust gas purification catalyst device of the present invention has a catalyst coating layer formed on the at least one substrate. The catalyst coating layer has the first catalyst coating layer on the exhaust gas flow upstream side and the second catalyst coating layer on the exhaust gas flow downstream side.

(First Catalyst Coating Layer)

The first catalyst coating layer is arranged on the exhaust gas flow upstream side and contains a hydrocarbon adsorbent and a catalyst noble metal.

—Hydrocarbon Adsorbent—

The hydrocarbon adsorbent contained in the first catalyst coating layer can be divided into, for example, hydrocarbon adsorbents that are inorganic oxides and other hydrocarbon adsorbents. Examples of the hydrocarbon adsorbents that are inorganic oxides include zeolite, silica gel, and activated alumina. Examples of the other hydrocarbon adsorbents include activated carbon.

The hydrocarbon adsorbent of the present invention typically contains a zeolite.

Any zeolite may be used as the hydrocarbon adsorbent of the present invention. However, in order to facilitate HC adsorption, the pore size may be intermediate or larger, and specifically, 10- or more-membered rings may constitute channels. From this point of view, the zeolite as the hydrocarbon adsorbent of the present invention may be, for example, TON, MFI, or MEL having 10-membered ring channels; FAU, MOR, or LTL having 12-membered ring channels; or UTD-1, CIT-5, or VFI having 14- or 18-membered ring channels.

The zeolite as the hydrocarbon adsorbent of the present invention may be a zeolite in which the cations in the skeleton are ion-exchanged with, for example, $H^+$, $K^+$, $Ca^{2+}$, $Cu^{2+}$, or $Fe^{3+}$.

From the viewpoint of imparting sufficiently high HC adsorption ability, the content of the hydrocarbon adsorbent in the first catalyst coating layer may be, as an amount of hydrocarbon adsorbent per liter of substrate volume, for example, 10 g/L or more, 30 g/L or more, 40 g/L or more, 50 g/L or more, 60 g/L or more, 70 g/L or more, 100 g/L or more, or 120 g/L or more. Conversely, from the viewpoint of preventing an excessive increase in pressure loss, the content of the hydrocarbon adsorbent in the first catalyst coating layer may be, as an amount of hydrocarbon adsorbent per liter of substrate volume, for example, 200 g/L or less, 150 g/L or less, 120 g/L or less, 100 g/L or less, 80 g/L or less, 60 g/L or less, or 50 g/L or less.

As will be described later, the first catalyst coating layer may contain the hydrocarbon adsorbent and the catalyst noble metal described in the next section, as well as other optional components (for example, an inorganic oxide). In this case, from the viewpoint of imparting sufficiently high HC adsorption ability, the content of the hydrocarbon adsorbent relative to the total mass of the first catalyst coating layer may be, for example, 1 mass %, 5 mass % or more, 10 mass % or more, 15 mass % or more, 20 mass % or more, 25 mass % or more, or 30 mass % or more.

In order to ensure the effects brought about by including components other than the hydrocarbon adsorbent, for example, the atmosphere relaxation ability by including an OSC material, the content of the hydrocarbon adsorbent relative to the total mass of the first catalyst coating layer may be, for example, 60 mass % or less, 50 mass % or less, 40 mass % or less, 35 mass % or less, 30 mass % or less, 25 mass % or less, or 20 mass % or less.

—Catalyst Noble Metal—

The first catalyst coating layer contains a catalyst noble metal.

The catalyst noble metal contained in the first catalyst coating layer may be a platinum group metal, and specifically, may be one, two, or three selected from rhodium (Rh), palladium (Pd), and platinum (Pt). Typically, Rh is contained and one or two selected from Pd and Pt may further be contained.

When the catalyst noble metal of the first catalyst coating layer contains Rh, the reaction between HC contained in the exhaust gas or slowly released after being adsorbed by the first catalyst coating layer and NOx contained in the exhaust gas is promoted, which contributes to the reduction of both HC and NOx emissions.

When the catalyst noble metal of the first catalyst coating layer contains one or two selected from Pd and Pt, the oxidative purification of HC contained in the exhaust gas or gradually released after being adsorbed by the first catalyst coating layer is promoted, which contributes to the reduction of HC emissions.

The content of the catalyst noble metal in the first catalyst coating layer may be, as a noble metal mass per liter of substrate volume, for example, 0.01 g/L or more, 0.03 g/L or more, 0.05 g/L or more, 0.10 g/L or more, 0.15 g/L or more, 0.30 g/L or more, 0.40 g/L or more, or 0.50 g/L or more, and may be, for example, 10.00 g/L or less, 8.00 g/L or less, 6.00 g/L or less, 4.00 g/L or less, 3.00 g/L or less, 2.00 g/L or less, 1.50 g/L or less, 1.20 g/L or less, 1.00 g/L or less, 0.80 g/L or less, 0.60 g/L or less, 0.50 g/L or less, 0.40 g/L or less, 0.30 g/L or less, 0.15 g/L or less, 0.10 30 g/L or less, or 0.01 g/L or less.

—Optional Components—

The first catalyst coating layer may contain a hydrocarbon adsorbent and a catalyst noble metal as well as other optional components. The optional components may be, for example, an inorganic oxide, an alkali metal compound, an alkaline earth metal compound, or a binder.

The inorganic oxide as an optional component is different than the hydrocarbon adsorbent, and may be, for example, an oxide of one or more elements selected from Al, Si, Ti, Zr, La, and Ce. When the inorganic oxide is an oxide of two or more elements, the inorganic oxide may be a mixture of a plurality of inorganic oxides, a composite oxide containing a plurality of elements, or an inorganic oxide containing both thereof. Specifically, the inorganic oxide may be, for example, alumina, silica, titania, a silica-alumina composite oxide (excluding zeolite), ceria, zirconia, or a ceria-zirconia composite oxide (CZ).

The first catalyst coating layer may contain a material having oxygen storage capacity (OSC material). When the first catalyst coating layer contains an OSC material, the atmosphere relaxation ability of the OSC material allows the vicinity of the zeolite to be in an oxidizing atmosphere even when the atmosphere is rich, thereby suppressing structural destruction of the zeolite. The atmosphere relaxation ability of the OSC material enables catalytic purification of the HC adsorbed by the hydrocarbon adsorbent even when the atmosphere is rich, whereby deterioration of the hydrocarbon adsorbent due to excessive accumulation of HC can be suppressed.

The OSC material is typically ceria. The ceria may be contained in the first catalyst coating layer in the form of CZ.

From the viewpoint of imparting sufficient atmosphere relaxation ability, the content of the OSC material in the first catalyst coat may be, as an amount of hydrocarbon adsorbent per liter of substrate volume, for example, 10 g/L or more, 12 g/L or more, 15 g/L or more, 18 g/L or more, 20 g/L or more, 22 g/L or more, 25 g/L or more, or 30 g/L or more. Conversely, from the viewpoint of preventing an excessive increase in pressure loss, the content of the OSC material in the first catalyst coating layer may be, as an amount of OSC material per liter of substrate volume, for example, 100 g/L or less, 80 g/L or less, 50 g/L or less, 30 g/L or less, 25 g/L or less, or 20 g/L or less.

From the viewpoint of effectively preventing deterioration of the hydrocarbon adsorbent while ensuring sufficiently high hydrocarbon adsorption capacity in the first catalyst coat, the ratio ($W_{AHC}/W_{OSC}$) of the mass ($W_{OSC}$) of the OSC material to the mass ($W_{AHC}$) of the hydrocarbon adsorbent may be, for example, 1.0 or more, 1.5 or more, 2.0 or more, 2.5 or more, 3.0 or more, 5.0 or more, or 10 or more, and may be, for example, 50.0 or less, 40.0 or less, 30.0 or less, 20.0 or less, 15.0 or less, 10.0 or less, 8.0 or less, 5.0 or less, 3.0 or less, or 2.5 or less.

The catalyst noble metal described above may be supported, for example, in the form of fine particles on one or more types of particles selected from the hydrocarbon adsorbent and additional inorganic oxides.

Examples of alkali metal compounds include potassium compounds and lithium compounds; examples of alkaline earth metal compounds include calcium compounds, barium compounds, and strontium compounds; and each can be used in the first catalyst coating layer of the exhaust gas purification catalyst device of the present invention as a sulfate, nitrate, or chloride.

The binder may be one or more selected from, for example, alumina sol, titania sol, silica sol, and zirconia sol.

—Multilayer Structure—

The first catalyst coating layer may be either a single-layer structure or a multilayer structure. However, from the viewpoint of maximizing exhaust gas catalytic purification ability, the first catalyst coating layer may have a two-layer or three-layer structure in which the layer which mainly serves as an exhaust gas catalytic purification layer is separated from the layer which serves as the HC adsorption layer.

When the first catalyst coating layer has a multilayer structure, from the viewpoint of ensuring that the HC slowly released after warm-up will reliably come into contact with the catalyst noble metal and be catalytically purified, it is appropriate for a layer which mainly serves as the exhaust gas catalytic purification layer to be arranged as the uppermost layer.

Thus, the first catalyst coating layer may have:
a hydrocarbon adsorption layer which is formed on the substrate and which contains the hydrocarbon adsorbent, and
a first catalyst noble metal layer which is formed on the hydrocarbon adsorption layer and which contains a catalyst noble metal.

When the first catalyst coating layer has a three-layer structure, the first catalyst coating layer may further comprise a hydrocarbon adsorbent-enriched layer consisting mainly of a hydrocarbon adsorbent between the substrate of the case of a two-layer structure and the hydrocarbon adsorption layer.

Thus, the first catalyst coating layer may have, for example:
a hydrocarbon adsorbent-enriched layer which is formed on the substrate and which is composed mainly of the hydrocarbon adsorbent,
a hydrocarbon adsorption layer which is formed on a hydrocarbon adsorbent-enriched layer and which contains the hydrocarbon adsorbent, and
a first catalyst noble metal layer which is formed on the hydrocarbon adsorption layer and which contains the catalyst noble metal.

As described above, from the viewpoint of separating the layer serving as the HC adsorption layer and the layer serving as the exhaust gas catalytic purification layer, the first catalyst noble metal layer need not contain the hydrocarbon adsorbent.

The first catalyst noble metal layer may contain an inorganic oxide other than the hydrocarbon adsorbent. The first catalyst noble metal layer may contain an OSC material, for example, ceria, in the form of, for example, CZ. The first catalyst noble metal layer may further contain an inorganic oxide, such as alumina, other than the hydrocarbon adsorbent and OSC material.

The first catalyst noble metal layer may contain a catalyst noble metal selected from platinum group elements, and may contain, in particular, Rh. This catalyst noble metal may be supported on one or more inorganic oxides other than the hydrocarbon adsorbent in the first catalyst noble metal layer.

The first catalyst noble metal layer may further contain a binder.

The hydrocarbon adsorption layer is a layer which contains the hydrocarbon adsorbent.

The hydrocarbon adsorption layer may contain an inorganic oxide other than the hydrocarbon adsorbent. The hydrocarbon adsorption layer may contain the OSC material, such as ceria, in the form of, for example, CZ. The hydrocarbon adsorption layer may further contain an inorganic oxide, such as alumina, other than the hydrocarbon adsorbent and the OSC material.

The hydrocarbon adsorption layer may further contain one or more selected from an alkali metal compound, an alkaline earth metal compound, and a binder.

As can be understood from the foregoing, in the first catalyst coating layer of the exhaust gas purification catalyst device of the present invention, the first catalyst noble metal layer and the hydrocarbon adsorption layer may each contain an OSC material. At this time, the ratio between the amount of OSC material in the first catalyst noble metal layer and the amount of OSC material in the hydrocarbon adsorption layer is arbitrary. The ratio of the mass of the OSC material in the hydrocarbon adsorption layer to the total mass of OSC in the first catalyst coating layer may be, for example, 30 mass % or more, 40 mass % or more, 50 mass % or more, 60 mass % or more, or 70 mass % or more, and may be, for example, 90 mass % or less, 80 mass % or less, 70 mass % or less, 60 mass % or less, or 50 mass % or less.

A hydrocarbon adsorbent-enriched layer is a layer which is mainly composed of the hydrocarbon adsorbent. The hydrocarbon adsorbent-enriched layer being "mainly composed of the hydrocarbon adsorbent" means that the mass of the hydrocarbon adsorbent in the hydrocarbon adsorbent-enriched layer, relative to the total mass of the hydrocarbon adsorbent-enriched layer, is 70 mass % or more, 80 mass % or more, 85 mass % or more, 90 mass % or more, 95 mass % or more, or 98 mass % or more.

The hydrocarbon adsorbent-enriched layer may contain, for example, a binder in addition to the hydrocarbon adsorbent.

—Zone Structure—

The first catalyst coating layer may be a coating layer having the same composition over the entire length of the substrate, or the exhaust gas flow upstream side portion and the downstream side portion may have different compositions.

When the first catalyst coating layer has a multilayer structure, each layer constituting the first catalyst coating layer may be a coating layer having the same composition over the entire length of the substrate, or the exhaust gas flow upstream side portion and the downstream side portion may have different compositions.

(Second Catalyst Coating Layer)

In the exhaust gas purification catalyst device of the present invention, the second catalyst coating layer is arranged on the exhaust gas flow downstream side and contains a nitrogen oxide adsorbent and a catalyst noble metal.

—Nitrogen Oxide Adsorbent—

The hydrocarbon adsorbent contained in the first catalyst coating layer may contain, for example, one or more selected from a spinel, a praseodymium oxide, and palladium (Pd).

As used herein, "spinel" is a concept which includes, in addition to magnesium aluminate ($MgAl_2O_4$), iron spinel ($FeAl_2O_4$), zinc spinel ($ZnAl_2O_4$), manganese spinel ($MnAl_2O_4$), and rare earth spinels (rare earth-Al—Mg composite oxides). Specific examples of rare earth spinels include La—Ce—Al—Mg composite oxides (La:Ce:Al:Mg=2.0:17.8:64.4:15.7 (oxide conversion mass ratio)).

The praseodymium oxide may be selected from praseodymium(III) oxide ($Pr_2O_3$), hexapraseodymium eleven oxide ($Pr_6O_{11}$), and mixtures thereof.

The palladium (Pd) may be fine particles of metallic Pd, or may be in a state supported on inorganic oxide particles. The most favorable state of existence of the Pd as the nitrogen oxide adsorbent is in the form of a "Pd-enriched layer" which is locally supported on the surface layer portion (a portion from the outermost surface of the layer to a certain depth) of the layer composed of the inorganic oxide.

From the viewpoint of imparting a sufficiently high NOx adsorption capacity, the content of the nitrogen oxide adsorbent in the second catalyst coating layer may be, as an amount of nitrogen oxide adsorbent per liter of substrate volume, for example, 5 g/L or more, 10 g/L or more, 15 g/L or more, 20 g/L or more, 25 g/L or more, or 30 g/L or more. Conversely, from the viewpoint of preventing an excessive increase in pressure loss, the content of nitrogen oxide adsorbent in the second catalyst coating layer may be, as an amount of nitrogen oxide adsorbent per liter of substrate volume, for example, 100 g/L or less, 80 g/L or less, 60 g/L or less, 50 g/L or less, 45 g/L or less, 40 g/L or less, or 35 g/L or less.

—Catalyst Noble Metal—

The second catalyst coating layer contains a catalyst noble metal.

The catalyst noble metal contained in the second catalyst coating layer may be a platinum group element, specifically one or more selected from palladium (Pd), platinum (Pt), and rhodium (Rh), and may be one or two selected from platinum (Pt) and rhodium (Rh). Typically, Rh may be contained.

The content of the catalyst noble metal in the second catalyst coating layer may be, as a noble metal mass per liter of substrate volume, for example, 0.01 g/L or more, 0.03 g/L or more, 0.05 g/L or more, 0.10 g/L or more, 0.15 g/L or more, 0.30 g/L or more, 0.40 g/L or more, or 0.50 g/L or more, and may be, for example, 10.00 g/L or less, 8.00 g/L or less, 6.00 g/L or less, 4.00 g/L or less, 3.00 g/L or less, 2.00 g/L or less, 1.50 g/L or less, 1.20 g/L or less, 1.00 g/L or less, 0.80 g/L or less, 0.60 g/L or less, 0.50 g/L or less, 0.40 g/L or less, 0.30 g/L or less, 0.15 g/L or less, 0.10 g/L or less, or 0.01 g/L or less.

When the second catalyst coating layer contains Pd, the Pd serves mainly as a nitrogen oxide adsorbent. Pd is known as a catalyst noble metal which catalyzes oxidation purification of HC. In the exhaust gas purification catalyst device of the present invention, HC in the exhaust gas is mostly purified and removed by the first catalyst coating layer.

—Optional Components—

The second catalyst coating layer may contain a nitrogen oxide adsorbent, a catalyst noble metal, and other optional components. The optional components may be, for example, an inorganic oxide and a binder.

The inorganic oxide as an optional component is an inorganic oxide other than the nitrogen oxide adsorbent, and may be, for example, an oxide of one or more elements selected from Al, Si, Ti, Zr, La, and Ce. When the inorganic oxide is an oxide of two or more elements, it may be a mixture of a plurality of inorganic oxides, a composite oxide containing a plurality of elements, or an inorganic oxide containing both of these. Specifically, the inorganic oxide may be, for example, alumina, silica, titania, a silica-alumina composite oxide (excluding zeolite), ceria, zirconia, or a ceria-zirconia composite oxide (CZ).

The second catalyst coating layer may contain a material having oxygen storage capacity (OSC material). It is advantageous when the second catalyst coating layer contains an OSC material, since the catalyst-containing gas atmosphere is relaxed, whereby the nitrogen oxide adsorbent can stably adsorb NOx.

The OSC material is typically ceria. The ceria may be contained in the first catalyst coating layer in the form of pure ceria or CZ.

From the viewpoint of imparting sufficient atmosphere relaxation ability, the content of the OSC material in the second catalyst coat may be, as an OSC material amount per liter of substrate volume, for example, 1 g/L or more, 3 g/L or more, 5 g/L or more, 8 g/L or more, 10 g/L or more, 12 g/L or more, or 15 g/L or more. Conversely, from the viewpoint of preventing an excessive increase in pressure loss, the content of the OSC material in the first catalyst coating layer may be, as an OSC material amount per liter of substrate volume, for example, 50 g/L or less, 40 g/L or less, 30 g/L or less, 25 g/L or less, 20 g/L or less, or 15 g/L or less.

The catalyst noble metal described above may be supported, for example, in the form of fine particles on one or more selected from the nitrogen oxide adsorbent and additional inorganic oxides.

The binder may be, for example, one or more selected from alumina sol, titania sol, silica sol, and zirconia sol.

—Multilayer Structure—

The second catalyst coating layer may have either a single-layer structure or a multilayer structure.

When the second catalyst coating layer has a single-layer structure, the nitrogen oxide adsorbent, the catalyst noble metal, and optional components in addition thereto may be uniformly or substantially uniformly distributed and present in the second catalyst coating layer.

When the second catalyst coating layer has a multilayer structure, the second catalyst coating layer may have, for example, a two-layer structure having:

a second catalyst noble metal layer containing the catalyst noble metal, and a nitrogen oxide adsorption layer which is formed on the second catalyst noble metal layer or as a portion of the surface layer of the second catalyst noble metal layer and which contains the nitrogen oxide adsorbent.

When the second catalyst coating layer has such a two-layer structure, the exhaust gas having a reduced HC concentration due to the first catalyst coating layer on the upstream side directly contacts, in the second catalyst coating layer on the downstream side, the nitrogen oxide adsorbent contained on the second catalyst noble metal layer or in the surface layer portion of the second catalyst noble metal layer. As a result, the second catalyst coating layer can further efficiently adsorb NOx and reduce the NOx emission amount prior to warm-up.

The nitrogen oxide adsorption layer of the second catalyst coating layer may be, for example, a Pd-enriched layer which is formed in a surface layer portion (a portion from the surface of the layer to a predetermined depth) of the second catalyst noble metal layer.

The Pd amount of the Pd-enriched layer may be, as a Pd metal mass per liter of substrate volume, for example, 0.5 g/L or more, 1.0 g/L or more, 1.5 g/L or more, 2.0 g/L or more, 2.5 g/L or more, or 3.0 g/L or more, and may be, for example, 15 g/L or less, 10 g/L or less, 8 g/L or less, 6 g/L or less, 5 g/L or less, 4 g/L or less, or 3 g/L or less.

Even when the second catalyst coating layer has a nitrogen oxide adsorption layer, the second catalyst noble metal layer of the second catalyst coating layer may contain a nitrogen oxide adsorbent which is the same as or different than that contained in the nitrogen oxide adsorption layer. For example, the second catalyst noble metal layer may contain, as a nitrogen oxide adsorbent, one or two selected from a spinel and praseodymium oxide.

The content of the one or two selected from a spinel and praseodymium oxide in the second catalyst coating layer may be, as a total amount thereof per liter of substrate volume, for example, 5 g/L or more, 10 g/L or more, 15 g/L or more, 20 g/L or more, or 25 g/L or more. Conversely, from the viewpoint of preventing an excessive increase in pressure loss, the content of the one or two selected from a spinel and praseodymium oxide in the second catalyst coating layer may be, as a total amount thereof per liter of substrate volume, for example, 80 g/L or less, 60 g/L or less, 50 g/L or less, 45 g/L or less, 40 g/L or less, 35 g/L or less, or 30 g/L or less.

<Configuration of Exhaust Gas Purification Catalyst Device>

As the exhaust gas purification catalyst device of the present invention, for example, the first exhaust gas purification catalyst device and the second exhaust gas purification catalyst device described below can be exemplified.

<First Exhaust Gas Purification Catalyst Device>

The first exhaust gas purification catalyst device is an exhaust gas purification catalyst device having two substrates.

The first exhaust gas purification catalyst device having two substrates may be, for example, an exhaust gas purification catalyst device in which:

a first catalyst coating layer is formed on a first substrate, a second catalyst coating layer is formed on a second substrate, and the first substrate having the first catalyst coating layer and the second substrate having the second catalyst coating layer are arranged in series in this order from the exhaust gas flow upstream side.

(Second Exhaust Gas Purification Catalyst Device)

The second exhaust gas purification device is an exhaust gas purification catalyst device having one substrate.

The second exhaust gas purification catalyst device having one substrate may be, for example, an exhaust gas purification catalyst device in which:

a first catalyst coating layer and a second catalyst coating layer are formed on the one substrate in this order from the exhaust gas flow upstream side.

<Specific Embodiment of Exhaust Gas Purification Device>

Figure 3:
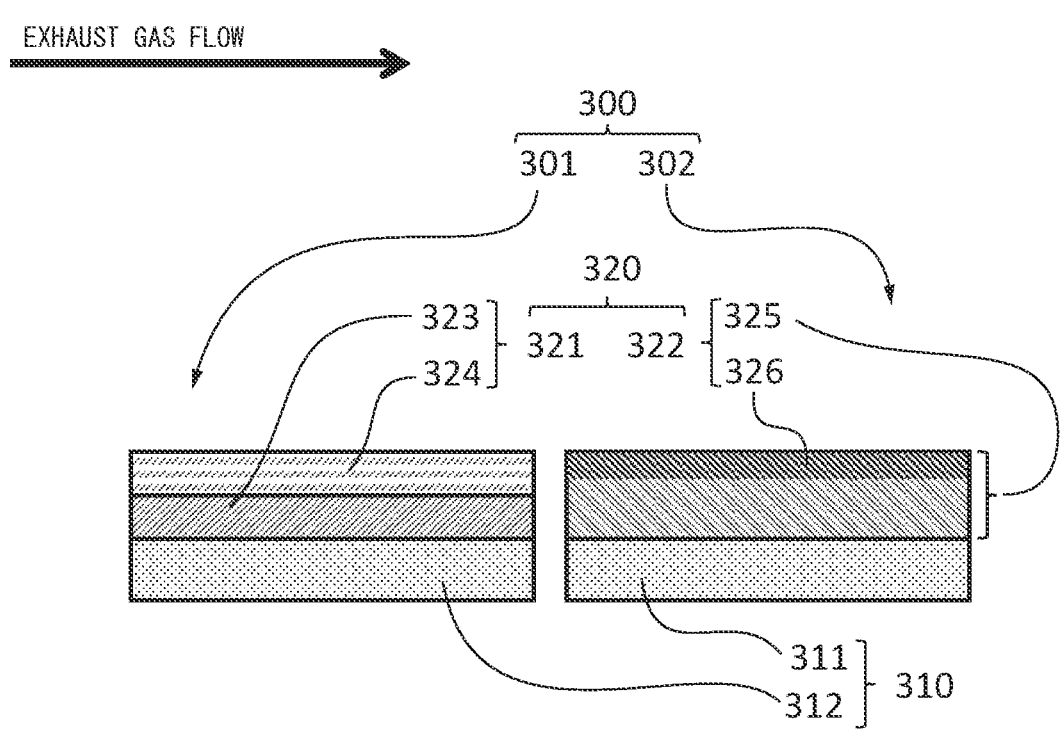
FIG. 3 is a schematic view showing the structure of an embodiment of the exhaust gas purification catalyst device of the present invention.
Figure 4:
FIG. 4 is a schematic view showing the structure of another embodiment of the exhaust gas purification catalyst device of the present invention.
Figure 4:
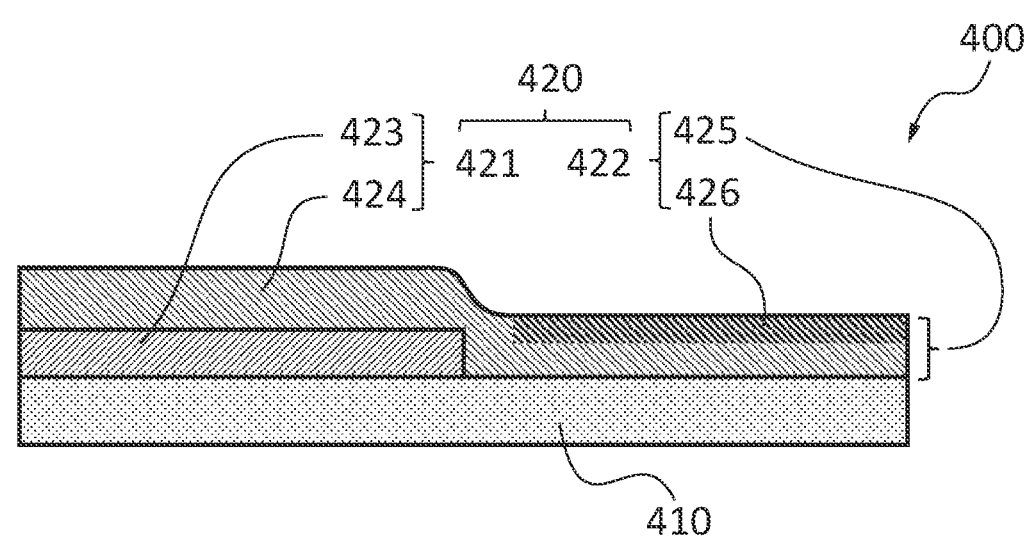

Configuration examples of embodiments of the exhaust gas purification device of the present invention are shown in FIGS. 3 and 4. The exhaust gas purification device of the present invention is not limited to the embodiments shown in these drawings.

The exhaust gas purification catalyst device (300) of FIG. 3 has:

a first sub-device (301) composed of a first substrate (311) and a first catalyst coating layer (321) formed on the first substrate (311), and a second sub-device (302) composed of a second substrate (312) and a second catalyst coating layer (322) formed on the second substrate (312), wherein the first sub-device (301) and the second sub-device (302) are arranged in series in this order from the exhaust gas flow upstream side.

Thus, the catalyst coating layer (320) of the exhaust gas purification catalyst device (300) of FIG. 3 is composed of the first catalyst coating layer (321) formed on the first substrate (311) and the second catalyst coating layer (322) formed on the second substrate (312).

The first catalyst coating layer (321) of the first sub-device (301) has an HC adsorption layer (323) formed on the first substrate (311) and a first catalyst noble metal layer (324) formed on the HC adsorption layer (323).

The HC adsorption layer (323) of the first sub-device (301) may contain, for example, a hydrocarbon adsorbent (for example, zeolite), an OSC material, an additional inorganic oxide, an alkaline earth metal compound, a catalyst noble metal, and a binder, and the catalyst noble metal may be supported on one or more of the hydrocarbon adsorbent, OSC material, and additional inorganic oxide.

The first catalyst noble metal layer (324) may contain, for example, an OSC material, an additional inorganic oxide, and a catalyst noble metal, as well as a binder, and the catalyst noble metal may be supported on one or two of the OSC material and additional inorganic oxide.

The second catalyst coating layer (322) of the second sub-device (302) has a second catalyst noble metal layer (325) formed on the second substrate (312).

The second catalyst noble metal layer (325) may contain, for example, a nitrogen oxide adsorbent (for example, a spinel or praseodymium oxide), an OSC material, and an additional inorganic oxide, and a catalyst noble metal, as well as a binder, and the catalyst noble metal may be supported on one or more of the nitrogen oxide adsorbent, OSC material, and additional inorganic oxide.

In the second catalyst noble metal layer (325), a Pd-enriched layer (326) is formed as a surface layer portion (a portion of the layer from the outermost surface to a certain depth).

In the exhaust gas purification catalyst device (400) of FIG. 4, a first catalyst coating layer (421) and a second catalyst coating layer (422) are formed on one substrate (410) in this order from the exhaust gas flow upstream side.

Thus, the catalyst coating layer (420) of the exhaust gas purification catalyst device (400) of FIG. 4 is composed of the first catalyst coating layer (421) and the second catalyst coating layer (422) formed on the one substrate (410).

The first catalyst coating layer (421) has an HC adsorption layer (423) formed on the upstream side of the substrate (410) and a first catalyst noble metal layer (424) formed on the HC adsorption layer (423).

The HC adsorption layer (423) may contain, for example, a hydrocarbon adsorbent (for example, zeolite), an OSC material, an additional inorganic oxide, an alkaline earth metal compound, a catalyst noble metal, and a binder, and the catalyst noble metal may be supported on one or more of the hydrocarbon adsorbent, the OSC material, and additional inorganic oxide.

The first catalyst noble metal layer (424) may contain, for example, an OSC material, an additional inorganic oxide, and a catalyst noble metal, as well as a binder, and the catalyst noble metal may be supported on one or two of the OSC material and additional inorganic oxide.

The second catalyst coating layer (422) has a second catalyst noble metal layer (425). The second catalyst noble metal layer (425) may contain, for example, a nitrogen oxide adsorbent (for example, a spinel or praseodymium oxide), an OSC material, an additional inorganic oxide, and a catalyst noble metal, as well as a binder, and the catalyst noble metal may be supported on one or more of the nitrogen oxide adsorbent, OSC material, and additional inorganic oxide.

In the second catalyst noble metal layer (425), a Pd-enriched layer (426) is formed as a surface layer portion (a portion from the outermost surface of the layer to a certain depth).

<<Exhaust Gas Purification Device Production Method>>

The exhaust gas purifying device of the present invention can be produced by a known method, a method derived appropriately therefrom by a person skilled in the art, or a combination thereof.

A specific example of the production method will be described below using the exhaust gas purification catalyst device (300) shown in FIG. 3 as an example. However, the method for producing the exhaust gas purification device of the present invention is not limited thereto.

First, the first substrate (311) and the second substrate (312) are prepared in accordance with the desired substrates for the exhaust gas purification catalyst device (300).

Next, the HC adsorption layer (323) and the first catalyst noble metal layer (324) are sequentially formed on the first substrate (311) to produce the first sub-device (301). The second catalyst coating layer (322) is formed on the second substrate (312), and the Pd-enriched layer (326) is then formed near the surface of the second catalyst coating layer (322) to produce the second sub-device (302). The production of the first sub-device (301) and the production of the second sub-device (302) may be carried out simultaneously or in a random order.

The HC adsorption layer (323) on the first substrate (311) may be formed by a method comprising coating the first substrate (311) with an HC adsorption layer formation coating liquid, drying if necessary, and firing. The HC adsorption layer formation coating liquid can be an aqueous dispersion containing, for example, a hydrocarbon adsorbent, an OSC material, an additional inorganic oxide, an alkaline earth metal compound, and a catalyst noble metal precursor, as well as a binder.

The first catalyst noble metal layer (324) may be formed on the HC adsorption layer (323) on the first substrate (311) by a method comprising coating the HC adsorption layer (323) with a first catalyst noble metal layer formation coating liquid, drying if necessary, and firing. The first catalyst noble metal layer formation coating liquid can be an aqueous dispersion containing, for example, an OSC material, an additional inorganic oxide, and a catalyst noble metal precursor, as well as a binder.

The second catalyst coating layer (322) may be formed on the second substrate (312) by a method comprising coating the second substrate (312) with a second catalyst coating layer formation coating liquid, drying if necessary, and firing. The second catalyst coating layer formation coating liquid may be an aqueous dispersion containing, for example, a nitrogen oxide adsorbent, an OSC material, an additional inorganic oxide, and a catalyst noble metal precursor, as well as a binder.

The Pd-enriched layer (326) may be formed near the surface of the second catalyst coating layer (322) on the second substrate (312) by a method comprising, for example, coating the second catalyst coating layer (322) with a Pd-enriched layer formation coating liquid, drying if necessary, and firing. The Pd-enriched layer formation coating liquid may be, for example, an aqueous solution containing a Pd precursor and a thickener.

The Pd precursor of the Pd-enriched layer formation coating liquid may be, for example, palladium nitrate. The thickener can be, for example, hydroxyethyl cellulose, carboxymethylcellulose, hydroxypropylmethylcellulose, polyethylene oxide, or polyacrylic acid.

In the foregoing, as the catalyst noble metal precursor, a water-soluble precursor may be appropriately selected from among nitrates, sulfates, chlorides, and complexes of the desired catalyst noble metal.

EXAMPLES

In the catalyst devices produced in the Examples and Comparative Examples below, a straight type substrate composed of cordierite and having a volume of 1.075 L was used as the substrate.

Example 1

1. Production of HC Adsorption Catalyst Device (Sub-Device)

(1) Preparation of Lower Layer Formation Coating Liquid

A lower layer formation coating liquid was prepared by mixing the following ingredients:

Alumina particles: 39.99 g

Ce—Zr-based composite oxide particles A (ceria content: 40.0 mass %): 41.93 g (equivalent to 16.77 g of ceria)

Barium sulfate: 5.42 g

MFI type zeolite: 54.83 g

Palladium nitrate: 2.13 g (metal conversion value)

Alumina binder: 2.58 g

Ion-exchanged water (2) Preparation of Upper Layer Formation Coating Liquid

An upper layer formation coating liquid was prepared by mixing the following ingredients:

Alumina particles: 63.21 g

Ce—Zr-based composite oxide particles B (ceria content 21.1 mass %): 36.42 g (equivalent to 7.65 g of ceria)

Rhodium nitrate: 0.15 g (metal conversion value)

Alumina binder: 0.75 g

Ion-exchanged water (3) Production of HC Adsorption Catalyst Device

A substrate was coated with the lower layer formation coating liquid over the entire length of the substrate length from the exhaust gas flow downstream end of the substrate and fired to form a lower layer, which is a Pd catalyst layer having HC adsorption ability, on the substrate at a coating amount of 146.86 g (136.61 g/L).

The substrate having the lower layer formed thereon as described above was coated with the upper layer formation coating liquid over the entire length of the substrate length and fired to form an upper layer, which is an Rh catalyst layer, on the lower layer at a coating amount of 100.54 g (93.53 g/L).

By the above operations, an HC adsorption noble metal catalyst device having, on the substrate in this order, the lower layer, which is a Pd catalyst layer having HC adsorption ability, and the upper layer, which is an Rh catalyst layer, was produced.

In the HC adsorption noble metal catalyst device produced as described above, the zeolite was arranged in the lower layer, and the zeolite mass ($M_{ZEO}$) was 54.83 g (51.00 g/L). 16.77 g of ceria was arranged in the lower layer and 7.65 g thereof was arranged in the upper layer, and the total mass ($M_{CeO2}$) thereof was 24.45 g (22.74 g/L). Therefore, the ratio ($M_{ZEO}/M_{CeO2}$) of the mass of zeolite ($M_{ZEO}$) to the total mass of ceria ($M_{CeO2}$) in this HC adsorption catalyst device was 2.24.

2. Production of NOx Adsorption Catalyst Device (Sub Device)

(1) Preparation of NOx Adsorption Rh Catalyst Layer Formation Coating Liquid

A lower layer formation coating liquid was prepared by mixing the following ingredients:

Alumina particles: 40.70 g

Ceria: 12.21 g

Spinel (La—Ce—Al—Mg composite oxide (La:Ce:Al:Mg=2.0:17.8:64.4:15.7 (mass ratio in terms of oxide))): 24.42 g $Pr_6O_{11}$: 4.07 g Rhodium nitrate: 0.24 g (metal conversion value)

Alumina binder: 1.2 g

Ion-exchanged water (2) Preparation of Pd-Enriched Layer Formation Coating Liquid A Pd-enriched layer formation coating liquid was prepared by dissolving 3.23 g (metal conversion value) of palladium nitrate and 2.97 g of hydroxyethyl cellulose as a thickening agent in deionized water.

(3) Production of NOx Adsorption Catalyst Device

A substrate was coated with the NOx adsorption Rh catalyst layer formation coating liquid over the entire length of the substrate length and fired to form a NOx-adsorption Rh catalyst layer on the substrate.

Next, the substrate having the NOx-adsorption Rh catalyst layer formed thereon was coated with the Pd-enriched layer formation coating liquid over the entire length of the substrate length from the exhaust gas flow upstream end of the substrate and fired to form a Pd-enriched layer having NOx adsorption ability in a region near a surface of the NOx adsorption Rh catalyst layer in the depth direction from the outermost surface. The amount of Pd in the Pd-enriched layer was 3.23 g (3.03 g/L) as a metal conversion value.

By the above operations, a NOx-adsorbing catalyst device having the NOx-adsorbing Rh catalyst layer on the substrate and the Pd-enriched layer having NOx-adsorbing ability in the region near the surface of the NOx-adsorbing Rh catalyst layer was produced.

3. Structure and Evaluation of Exhaust Gas Purification Catalyst Device

The HC adsorption catalyst device (sub-device) and the NOx adsorption catalyst device (sub-device) obtained as described above were arranged in series in this order from the exhaust gas flow upstream side to construct the exhaust gas purification catalyst device of Example 1. The exhaust gas purification performance of this exhaust gas purification catalyst device was evaluated in the initial state without durability testing.

The exhaust gas purification catalyst device of Example 1 was connected to the exhaust system of an actual vehicle equipped with a 2.0 L gasoline engine installed on the drive stand to carry out a simulation test of WLTC mode running. At this time, the NOx purification ability of a cold portion was examined. Specifically, the integrated value of NOx emissions from the time the engine was started in a cold state until the temperature of the gas entering the exhaust gas purification catalyst device reached 300° C. was measured, and the rate of reduction of NOx emissions was evaluated using the NOx emissions in the case of no catalyst as a baseline (100%). As a result, in the exhaust gas purification catalyst device of Example 1, the rate of reduction of NOx emissions was 61.9%.

Examples 2 to 4 and Comparative Example 1

1. Production of HC Adsorption Catalyst Devices (Sub-Devices)

In the production of HC adsorption catalyst devices (sub-devices), the formation coating liquids for the respective layers were prepared in the same manner as Example 1 except that the compositions of the lower layer formation coating liquids and the upper layer formation coating liquids were changed as described in Table 1, to produce HC adsorption catalytic devices.

2. Production of NOx Adsorption Catalyst Devices (Sub-Devices)

Devices produced in the same manner as Example 1 were used as the NOx adsorption catalyst devices.

3. Structure and Evaluation of Exhaust Gas Purification Catalyst Devices

The HC adsorption catalyst devices (sub-devices) and the NOx adsorption catalyst devices (sub-devices) obtained as described above were arranged in series in this order from the exhaust gas flow upstream side to construct the exhaust gas purification catalyst devices of the Examples and Comparative Examples, and the exhaust gas purification performances thereof were evaluated in the same manner as Example 1.

The evaluation results are shown in Table 2.

Example 5

1. Production of HC Adsorption Catalyst Device (Sub-Device)

(1) Preparation of Zeolite Layer Formation Coating Liquid 107.5 g of MFI type zeolite, 5.375 g of an alumina binder, and deionized water were mixed to prepare a zeolite layer formation coating liquid.

(2) Preparation of Lower Layer Formation Coating liquid and Upper Layer Formation Coating Liquid A lower formation coating liquid and an upper formation coating liquid were prepared in the same manner as Example 1 except that the compositions of the respective coating liquids were changed as described in Table 1.

(3) Production of HC Adsorption Catalyst Device

A substrate was coated with the zeolite layer formation coating liquid over the entire length of the substrate length from the exhaust gas flow downstream end of the substrate and fired to form a zeolite layer having HC adsorption ability on the substrate at a coating amount of 112.88 g (105.00 g/L).

In the same manner as Example 1, except that in place of the substrate, a substrate having formed thereon the zeolite layer obtained above was used and both of the lower layer formation coating liquid and the upper layer formation coating liquid were used, an HC adsorption catalyst device having, on the substrate in this order, the zeolite layer having HC adsorption ability, a lower layer, which is a Pd catalyst layer having HC adsorption ability, and an upper layer, which is a Rh catalyst layer, was produced by forming the lower layer and the upper layer sequentially on the zeolite layer of the substrate.

2. Production of NOx Adsorption Catalyst Device (Sub-Device)

A device produced in the same manner as Example 1 was used as the NOx adsorption catalyst device.

3. Structure and Evaluation of Exhaust Gas Purification Catalyst Device

The HC adsorption catalyst device (sub-device) and the NOx adsorption catalyst device (sub-device) obtained as described above were arranged in series in this order from the exhaust gas flow upstream side to construct the exhaust gas purification catalyst device of Example 5, and the exhaust gas purification performance thereof was evaluated in the same manner as Example 1.

The evaluation results are shown in Table 2.

Example 6

1. Production of HC Adsorption Catalyst device (Sub-Device)

(1) Preparation of Lower Layer Rear Stage Formation Coating Liquid

A lower layer rear stage formation coating liquid was prepared by mixing the following ingredients:

Alumina particles: 20.64 g

Ce—Zr-based composite oxide particles (ceria content: 40.0 mass %): 30.96 g (equivalent to 12.38 g of ceria)

Barium sulfate: 2.71 g

MFI type zeolite: 16.13 g

Palladium nitrate: 0.85 g (metal conversion value)

Alumina binder: 1.29 g

Ion-exchanged water (2) Preparation of Lower Layer Front Stage Formation Coating Liquid A lower layer front stage formation coating liquid was prepared by mixing the following ingredients:

Alumina particles: 19.35 g

Ce—Zr-based composite oxide particles (ceria content: 40.0 mass %): 10.97 g (equivalent to 2.31 g of ceria)

Barium sulfate: 2.71 g

MFI type zeolite: 38.7 g

Palladium nitrate: 1.28 g (metal conversion value)

Alumina binder: 1.29 g

Ion-exchanged water (3) Preparation of Upper Stage Formation Coating Liquid

An upper layer formation coating liquid was prepared in the same manner as described in the section "Preparation of Upper Stage Formation Coating liquid" of Example 1.

(4) Production of HC Adsorption Catalyst Device

A substrate was coated with the lower layer rear stage formation coating liquid in an area of 60% of the substrate length from the exhaust gas flow downstream end of the substrate and fired to form the lower layer rear stage on the substrate at a coating amount of 74.29 g (115.18 g/L).

Next, the substrate having the lower layer rear stage part formed thereon was coated with the lower layer front sage formation coating liquid in an area of 60% of the substrate length from the exhaust gas flow upstream end of the substrate and fired to form the lower layer front stage on the substrate at a coating amount of 72.57 g (112.51 g/L).

By the above operations, the lower layer, which is a Pd catalyst layer having HC adsorption ability, was formed on the substrate.

The substrate having the lower layer formed thereon as described above was coated with the upper layer formation coating liquid over the entire length of the substrate length and fired to form an upper layer, which is an Rh catalyst layer, on the lower layer at a coating amount of 100.54 g (93.53 g/L).

By the above operations, an HC adsorption catalyst device having the substrate having thereon, in this order, the lower layer, which is a Pd catalyst layer having HC adsorption ability, and the upper layer, which is an Rh catalyst layer, was produced.

2. Production of NOx Adsorption Catalyst Device (Sub-Device)

A device produced in the same manner as Example 1 was used as the NOx adsorption catalyst device.

3. Structure and Evaluation of Exhaust Gas Purification Catalyst Device

The HC adsorption catalyst devices (sub-devices) and the NOx adsorption catalyst devices (sub-devices) obtained as described above were arranged in series in this order from the exhaust gas flow upstream side to construct the exhaust gas purification catalyst devices of the Examples and Comparative Example, and the exhaust gas purification performances thereof were evaluated in the same manner as Example 1.

The evaluation results are shown in Table 2.

Comparative Example 2

Exhaust gas purification performance was evaluated in the same manner as Example 1 except that a NOx adsorption catalyst device and an HC adsorption catalyst device produced in the same manner as Example 1 were arranged in series in this order from the exhaust gas flow upstream side to construct an exhaust gas purification catalyst device.

The evaluation results are shown in Table 2.

TABLE 1

|  |  | Ex 1 | Ex 2 | Ex 3 | Ex 4 |
|---|---|---|---|---|---|
| HC adsorption catalyst device Arrangement positions |  | Upstream side | Upstream side | Upstream side | Upstream side |
| Upper layer | Al$_2$O$_3$ | 63.21 | 63.21 | 63.21 | 63.21 |
|  | CZ-2 (21.1%-CeO$_2$) | 36.42 | 36.42 | 36.42 | 36.42 |
|  | Rh nitrate | 0.15 | 0.15 | 0.15 | 0.15 |
|  | Zeolite | 0.00 | 0.00 | 0.00 | 36.00 |
|  | Binder | 0.75 | 0.75 | 0.75 | 0.75 |
|  | Total | 100.54 | 100.54 | 100.54 | 136.54 |
| Lower layer | Zone | — | — | — | — |
|  | Al$_2$O$_3$ | 39.99 | 59.34 | 39.99 | 59.34 |
|  | CZ-1 (40.0%-CeO$_2$) | 41.93 | 22.58 | 56.76 | 22.58 |
|  | Ba sulfate | 5.42 | 5.42 | 22.06 | 5.42 |
|  | Zeolite | 54.83 | 54.83 | 54.83 | 0.00 |
|  | Pd nitrate | 2.13 | 2.13 | 2.13 | 2.13 |
|  | Binder | 2.58 | 2.58 | 2.58 | 2.58 |
|  | Total | 146.86 | 146.86 | 178.34 | 92.04 |
| Zeolite layer | Zeolite | — | — | — | — |
|  | Binder | — | — | — | — |
| Zeolite arrangement layer |  | Lower layer | Lower layer | Lower layer | Upper layer |
| Total zeolite |  | 54.83 | 54.83 | 54.83 | 36.00 |
| Total CeO$_2$ |  | 24.45 | 16.71 | 30.39 | 16.71 |
| Zeolite/CeO$_2$ Ratio |  | 2.24 | 3.28 | 1.80 | 2.15 |

(to be continued)

TABLE 2

Table 1. (continuation)

|  |  | Ex 5 | Ex 6 | | Comp Ex 1 | Comp Ex 2 |
|---|---|---|---|---|---|---|
| HC adsorption catalyst device arrangement position |  | Upstream side | Upstream side | | Upstream side | Downstream side |
| Upper layer | Al$_2$O$_3$ | 63.21 | 63.21 | | 63.21 | 63.21 |
|  | CZ-2 (21.1%-CeO$_2$) | 36.42 | 36.42 | | 36.42 | 36.42 |
|  | Rh nitrate | 0.15 | 0.15 | | 0.15 | 0.15 |
|  | Zeolite | 0.00 | 0.00 | | 0.00 | 0.00 |
|  | Binder | 0.75 | 0.75 | | 0.75 | 0.75 |
|  | Total | 100.54 | 100.54 | | 100.54 | 100.54 |
| Lower layer | Zone | — | Front stage 60% | Rear stage 60% | — | — |
|  | Al$_2$O$_3$ | 39.99 | 20.64 | 19.35 | 81.92 | 39.99 |
|  | CZ-1 (40.0%-CeO$_2$) | 41.93 | 30.96 | 10.97 | 0.00 | 41.93 |
|  | Ba sulfate | 5.42 | 2.71 | 2.71 | 5.42 | 5.42 |
|  | Zeolite | 12.90 | 16.13 | 38.70 | 54.83 | 54.83 |
|  | Pd nitrate | 2.125 | 0.85 | 1.28 | 2.13 | 2.13 |
|  | Binder | 2.58 | 1.29 | 1.29 | 2.58 | 2.58 |
|  | Total | 104.94 | 72.57 | 74.29 | 146.86 | 146.86 |
| Zeolite layer | Zeolite | 107.5 | — | — | — | — |
|  | Binder | 5.375 | — | — | — | — |
| Zeolite arrangement layer |  | Zeolite layer + lower layer | Lower layer | | Lower layer | Lower layer |
| Total zeolite |  | 120.40 | 54.83 | | 54.83 | 54.83 |
| Total CeO$_2$ |  | 24.45 | 24.45 | | 7.68 | 24.45 |
| Zeolite/CeO$_2$ Ratio |  | 4.92 | 2.24 | | 7.13 | 2.24 |

(the end of Table 1.)

The abbreviations of the components of the coating liquids of Table 1 have the following meanings.

Al$_2$O$_3$: alumina particles

CZ-1: Ce—Zr-based composite oxide particles A (ceria content 40.0 mass %)

CZ-2: Ce—Zr-based composite oxide particles B (ceria content 21.1 mass %)

Ba sulfate: barium sulfate

Zeolite: MFI type zeolite

Pd nitrate: palladium nitrate (values in Table 1 are metal conversion values)

Rh nitrate: rhodium nitrate

Binder: alumina binder

The numerical values in each column in Table 1 are in units of g (grams), except for the column "Zeolite/CeO$_2$ Ratio."

Comparative Example 3

1. Production of Conventional Catalyst Device (Sub-Device)

(1) Preparation of Lower Layer Formation Coating liquid

A lower layer formation coating liquid was prepared by mixing the following ingredients:

Alumina particles: 77.40 g

Ce—Zr-based composite oxide particles A (ceria content: 40.0 mass %): 48.38 (equivalent to 19.35 g of ceria)

Barium sulfate: 6.45 g

Palladium nitrate: 2.13 g (metal conversion value)

Alumina binder: 2.58 g

Ion-exchanged water (2) Preparation of Upper Layer Formation Coating Liquid

An upper layer formation coating liquid was prepared by mixing the following ingredients:

Alumina particles: 75.25 g

Ce—Zr-based composite oxide particles B (ceria content 21.1 mass %): 42.89 g (equivalent to 9.05 g of ceria)

Rhodium nitrate: 0.15 g (metal conversion value)

Alumina binder: 0.75 g

Ion-exchanged water and fired to form the upper layer, which is an Rh catalyst layer, on the lower layer at a coating amount of 112.89 g (105.02 g/L).

By the above operations, a conventional catalyst device having, in this order, the lower layer which is a Pd catalyst layer and the upper layer which is an Rh catalyst layer on the substrate was produced.

2. Production of NOx Adsorption Catalyst Device (Sub-Device)

A device produced in the same manner as Example 1 was used as the NOx adsorption catalyst device.

3. Structure and Evaluation of Exhaust Gas Purification Catalyst Device

The conventional catalyst device and the NOx adsorption catalyst device obtained as described above were arranged in series in this order from the exhaust gas flow upstream side to construct an exhaust gas purification catalyst device, and the exhaust gas purification performance thereof was evaluated in the same manner as Example 1.

The evaluation results are shown in Table 2.

Comparative Example 4

1. Production of HC Adsorption Catalyst Device (Sub-Device)

A device produced in the same manner as Example 1 was used as the HC adsorption catalyst device.

2. Production of Conventional Catalyst Device (Sub-Device)

A device produced in the same manner as Comparative Example 3 was used as the conventional catalyst device.

3. Structure and Evaluation of Exhaust Gas Purification Catalyst Device

The HC adsorption catalyst device and conventional catalyst device obtained as described above were arranged in series in this order from the exhaust gas flow upstream side to construct an exhaust gas purification catalyst device, and the exhaust gas purification performance thereof was evaluated in the same manner as Example 1.

The evaluation results are shown in Table 2.

TABLE 3

| | | | Ex 1 | Ex 2 | Ex 3 | Ex 4 | Ex 5 | Ex 6 | Comp Ex 1 | Comp Ex 2 | Comp Ex 3 | Comp Ex 4 |
|---|---|---|---|---|---|---|---|---|---|---|---|---|
| Catalyst structure device | Upstream side | | HC | HC | HC | HC | HC | HC | HC | NOx | Conventional | HC |
| | Downstream side | | NOx | NOx | NOx | NOx | NOx | NOx | NOx | HC | NOx | Conventional |
| HC device structure | CeO$_2$ Amount | (g/unit) | 24.45 | 16.71 | 30.39 | 16.71 | 24.45 | 24.45 | 7.68 | 24.45 | — | 24.45 |
| | | (g/L) | 22.74 | 15.54 | 28.27 | 15.54 | 22.74 | 22.74 | 7.14 | 22.74 | — | 22.74 |
| | Zeolite arrangement | | Lower layer | Lower layer | Lower layer | Upper layer | Zeolite layer + lower layer | Lower layer | Lower layer | Lower layer | — | Lower layer |
| | Zeolite/CeO$_2$ Ratio | | 2.24 | 3.28 | 1.80 | 2.15 | 4.92 | 2.24 | 7.13 | 2.24 | — | 2.24 |
| Eval Results | NOx emission reduction rate (%) | | 61.9 | 55.6 | 57.9 | 58.2 | 58.2 | 61.9 | 35.0 | 40.0 | 17.5 | 22.2 |

(3) Production of HC Adsorption Catalyst Device

A substrate was coated with the lower layer formation coating liquid over the entire length of the substrate length from the exhaust gas flow downstream end of the substrate and fired to form the lower layer, which is a Pd catalyst layer, on the substrate at a coating amount of 136.93 g (127.38 g/L).

The substrate having the lower layer formed thereon as described above was coated with the upper layer formation coating liquid over the entire length of the substrate length The abbreviations of the catalyst devices (sub-device) of Table 2 have the following meanings.

HC, HC device: HC adsorption catalyst device

NOx: NOx adsorption catalyst device

Conventional: conventional catalyst device

Referring to Table 3, the following can be understood.

In Comparative Examples 3 and 4, in which a conventional catalyst device was included as part of the sub-devices constituting the exhaust gas purification catalyst device, the rate of reduction of NOx emissions from engine start up to the point at which inlet gas temperature reached 300° C. was extremely low.

In Comparative Example 2, in which the NOx adsorption catalyst device and the HC adsorption catalyst device were arranged in this order from the upstream side of the exhaust gas flow, the rate of reduction of NOx emissions was insufficient.

Regarding Comparative Example 1, in which the amount of $CeO_2$ in the HC adsorption catalyst device was excessively small, the rate of reduction of NOx emissions was insufficient.

Conversely, in the exhaust gas purification catalyst devices of Examples 1 to 6, in which the specific NOx adsorption catalyst device and HC adsorption catalyst device of the present invention were arranged in this order from the upstream side of the exhaust gas flow, the rate of reduction of NOx emissions from engine start up until the inlet gas temperature reached 300° C. was high.

DESCRIPTION OF REFERENCE SIGNS

100, 200, 300, 400 exhaust gas purification catalyst device
110, 210, 310, 410 substrate
120, 220, 320, 420 catalyst coating layer
121, 221, 321, 421 first catalyst coating layer
122, 222, 322, 422 second catalyst coating layer
201, 301 first sub-device
202, 302 second sub-device
211, 311 first substrate
212, 312 second substrate
323, 423 HC adsorption layer
324, 424 first catalyst noble metal layer
325, 425 second catalyst noble metal layer
326, 426 Pd-enriched layer

The invention claimed is:

1. An exhaust gas purification catalyst device having a catalyst coating layer formed on at least one substrate, wherein:
    the catalyst coating layer contains a first catalyst coating layer on an exhaust gas flow upstream side and a second catalyst coating layer on an exhaust gas flow downstream side,
    the first catalyst coating layer contains a hydrocarbon adsorbent and a catalyst noble metal,
    the second catalyst coating layer contains a nitrogen oxide adsorbent and a catalyst noble metal, and
    the nitrogen oxide adsorbent comprises a spinel selected from the group consisting of magnesium aluminate $(MgAl_2O_4)$, iron spinel $(FeAl_2O_4)$, zinc spinel $(ZnAl_2O_4)$, manganese spinel $(MnAl_2O_4)$, and La—Ce—Al—Mg composite oxides.

2. The exhaust gas purification catalyst device according to claim 1, wherein the first catalyst coating layer has:
    a hydrocarbon adsorption layer which is formed on the substrate and which contains the hydrocarbon adsorbent, and
    a first catalyst noble metal layer which is formed on the hydrocarbon adsorption layer and which contains the catalyst noble metal.

3. The exhaust gas purification catalyst device according to claim 2, wherein the second catalyst coating layer has:
    a second catalyst noble metal layer which is formed on the substrate and which contains the catalyst noble metal, and
    a nitrogen oxide adsorption layer which is formed on the second catalyst noble metal layer or as a portion of a surface layer of the second catalyst noble metal layer, and which contains the nitrogen oxide adsorbent.

4. The exhaust gas purification catalyst device according to claim 3, wherein the second catalyst noble metal layer contains the spinel and a praseodymium oxide as the nitrogen oxide adsorbent, and
    the nitrogen oxide adsorption layer:
    is formed as a portion of a surface layer of the second catalyst noble metal oxide layer, and
    is a layer enriched in palladium (Pd) as the nitrogen oxide adsorbent.

5. The exhaust gas purification catalyst device according to claim 3, wherein
    the first catalyst coating layer contains an OSC material, and
    the second catalyst coating layer contains an OSC material.

6. The exhaust gas purification catalyst device according to claim 2, wherein the first catalyst coating layer contains an OSC material.

7. The exhaust gas purification catalyst device according to claim 1, wherein the second catalyst coating layer has:
    a second catalyst noble metal layer which is formed on the substrate and which contains the catalyst noble metal, and
    a nitrogen oxide adsorption layer which is formed on the second catalyst noble metal layer or as a portion of a surface layer of the second catalyst noble metal layer, and which contains the nitrogen oxide adsorbent.

8. The exhaust gas purification catalyst device according to claim 7, wherein the second catalyst noble metal layer contains the spinel and a praseodymium oxide as the nitrogen oxide adsorbent, and
    the nitrogen oxide adsorption layer:
    is formed as a portion of a surface layer of the second catalyst noble metal oxide layer, and
    is a layer enriched in palladium (Pd) as the nitrogen oxide adsorbent.

9. The exhaust gas purification catalyst device according to claim 7, wherein the second catalyst coating layer contains an OSC material.

10. The exhaust gas purification catalyst device according to claim 1, wherein the hydrocarbon adsorbent of the first catalyst coating layer contains a zeolite.

11. The exhaust gas purification catalyst device according to claim 1, wherein the content of the hydrocarbon adsorbent in the first catalyst coating layer is 60 mass % or less relative to the total mass of the first catalyst coating layer.

12. The exhaust gas purification catalyst device according to claim 1, wherein the first catalyst coating layer contains an OSC material.

13. The exhaust gas purification catalyst device according to claim 1, wherein the first catalyst coating layer contains rhodium (Rh).

14. The exhaust gas purification catalyst device according to claim 1, wherein the second catalyst coating layer contains an OSC material.

15. The exhaust gas purification catalyst device according to claim 1, wherein the second catalyst coating layer contains one or two catalyst noble metals selected from palladium (Pd), platinum (Pt), and rhodium (Rh).

16. The exhaust gas purification catalyst device according to claim 1, wherein the first catalyst coating layer is formed on a first substrate,

the second catalyst coating layer is formed on a second substrate, and the first substrate having the first catalyst coating layer and the second substrate having the second catalyst coating layer are arranged in series in this order from an exhaust gas flow upstream side.

17. The exhaust gas purification catalyst device according to claim 1, wherein the first catalyst coating layer and the second catalyst coating layer are formed on a single substrate in this order from an exhaust gas flow upstream side.

18. An exhaust gas purification method which uses the exhaust gas purification catalyst device according to claim 1, wherein the method comprises arranging the first catalyst coating layer and the second catalyst coating layer in series in this order from an exhaust gas flow upstream side, and circulating the exhaust gas over the first catalyst coating layer and the second catalyst coating layer.

19. The exhaust gas purification method according to claim 18, wherein the first catalyst coating layer is formed on a first substrate, the second catalyst coating layer is formed on a second substrate, and the first substrate having the first catalyst coating layer and the second substrate having the second catalyst coating layer are arranged in series in this order from an exhaust gas flow upstream side.

20. The exhaust gas purification method according to claim 18, wherein the first catalyst coating layer and the second catalyst coating layer are formed on a single substrate in this order from an exhaust gas flow upstream side.

* * * * *